United States Patent
Hermanns

[15] 3,664,191
[45] May 23, 1972

[54] EXPLOSION-PROOF SELF-CLEANING ELECTRODES

[72] Inventor: Henry Hermanns, Huntingdon Valley, Pa.
[73] Assignee: Fischer & Porter Company, Warminster, Pa.
[22] Filed: June 1, 1970
[21] Appl. No.: 42,319

[52] U.S. Cl. ..........................73/194 EM, 204/222, 310/11
[51] Int. Cl. ........................................................G01f 1/02
[58] Field of Search......................174/211; 73/194; 310/11; 204/222

[56] References Cited

UNITED STATES PATENTS

| | | | |
|---|---|---|---|
| 3,479,873 | 11/1969 | Hermanns | 73/194 |
| 1,701,562 | 2/1929 | Gordon | 174/211 X |
| 2,523,082 | 9/1950 | Wilson | 174/18 |
| 2,947,801 | 8/1960 | Doolittle | 174/141 |
| 3,486,376 | 12/1969 | Wada | 73/194 |
| 2,514,080 | 7/1950 | Mason | 171/327 |
| 3,341,430 | 9/1967 | Wickerham et al. | 204/1 |

*Primary Examiner*—Charles A. Ruehl
*Attorney*—Michael Ebert

[57] ABSTRACT

An explosion-proof, self-cleaning electrode for use in magnetic flowmeters, measurement probes and other instruments in which an electrode is exposed to a contaminating fluid that is explosive in nature and also tends to coat the electrode with material which interferes with its proper operation. The electrode is provided with an ultrasonic transducer to produce ultrasonic energy which is transmitted to the fluid to create cavitation effects therein, acting to clean the exposed surface of the electrode. The transducer is mounted on the electrode within a protective shield to prevent high voltage applied to the transducer from reaching the electrode and producing a spark igniting an explosive fluid.

5 Claims, 6 Drawing Figures

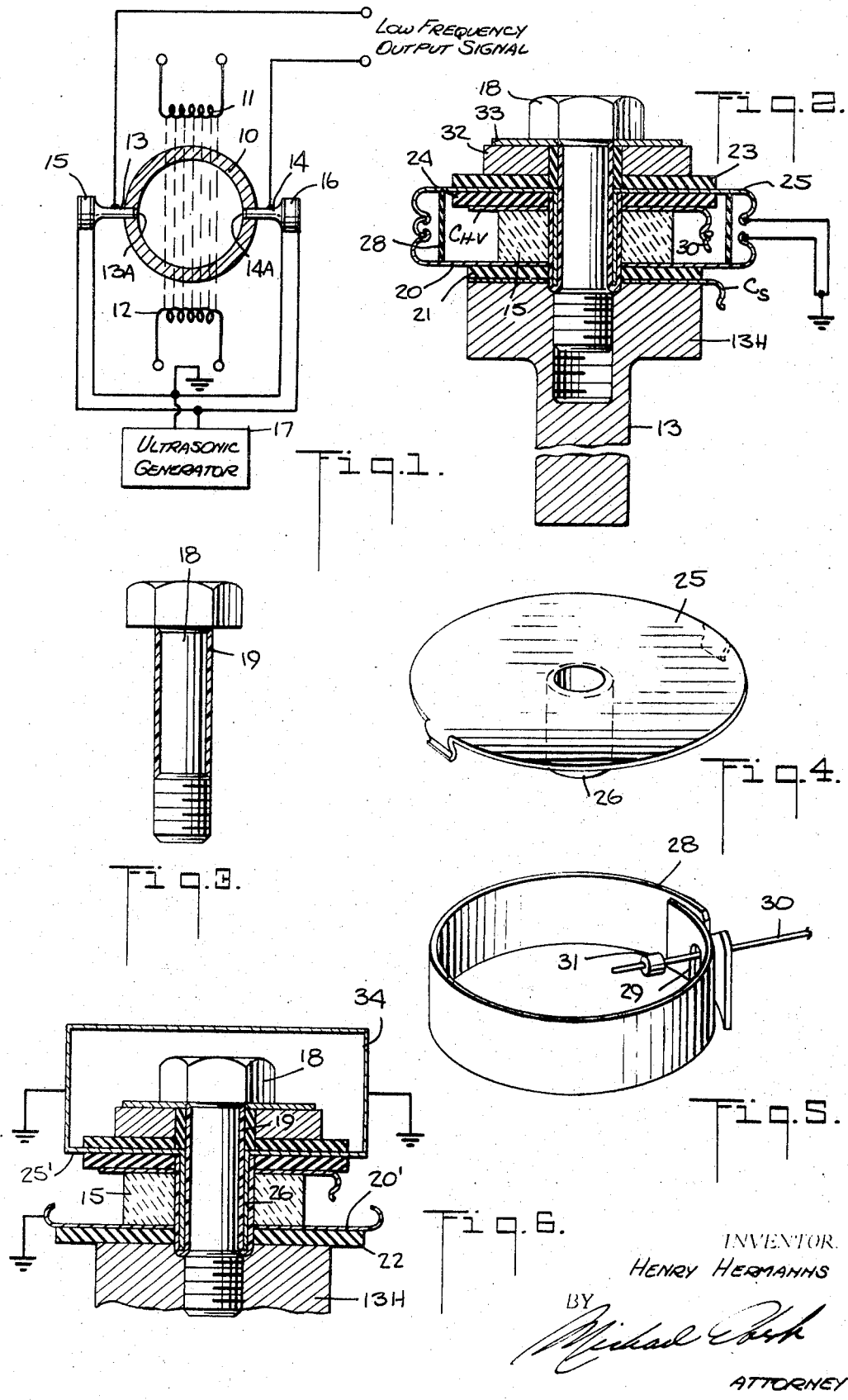

3,664,191

EXPLOSION-PROOF SELF-CLEANING ELECTRODES

BACKGROUND OF THE INVENTION

This invention relates generally to self-cleaning electrodes, and in particular to an electrode which is included in a measuring instrument for an explosive fluid having pollutants therein which tend to contaminate the electrode, the electrode being provided with an explosion-proof ultrasonic transducer to decontaminate the active surface thereof.

In such instruments as magnetic flowmeters and measurement probes for fluid process control, electrodes are incorporated therein having active surfaces exposed to the fluid. These electrodes become coated with contaminants contained in the fluid, as a consequence of which the operation of the instrument is impaired.

An example of such an instrument is a magnetic flowmeter adapted to measure volume rates of fluids which present difficult handling problems, such as corrosive acids, sewage, slurries, and detergents. In a magnetic flowmeter, a uniformly-distributed electromagnetic field is established which is mutually perpendicular to the longitudinal axis of the tube through which the fluid flows and to the axes of the meter electrodes.

Since the velocity of the fluid is directed along the longitudinal axis of the flow tube, the voltage induced within the fluid will be perpendicular both to the velocity of the fluid and the flux linkages of the magnetic field. The instantaneous voltage developed across the meter electrodes represents an average fluid velocity of the flow profile passing the electrodes at a given moment, and the flowmeter will therefore produce an output signal equal to a continuous average flow rate regardless of whether the flow profile is laminar or turbulent.

For proper operation of a magnetic flowmeter, the electrical conductivity of the path extending between the electrodes must be relatively high. The overall resistance of this path is determined by that of the fluid itself in series with the interface resistance between the fluid and the active surface of the electrodes. When meters are used to measure polluted fluids, such as fluids containing oils or sludge, as is often the case in many sewage systems, the oils or other contaminants tend to coat and adhere to the active surface of the electrodes. Since such coatings are insulating in character, as the coatings build up, the resultant interface resistance becomes very high and the electrical conductivity of the path between the electrodes is substantially diminished.

It his been found that when the resistance of the path rises beyond a predetermined value, the resultant voltage drop and attenuation of the output signal has an adverse effect on the meter accuracy. It has, therefore, been necessary to remove such contaminated meters from the flow stream in order to clean the electrode surface. This, of course, requires that the pipe line be disassembled, thereby temporarily shutting down the process.

In my prior U.S. Pat. No. 3,479,873, there are disclosed self-cleaning electrodes having ultrasonic transducers coupled thereto to produce ultrasonic energy for continuously decontaminating the active electrode surfaces exposed to polluted fluid without in any way interfering with the normal signal output developed at the electrodes, whereby the accuracy of the instrument is maintained at all times. The resultant cavitation of the fluid acts to remove foreign matter from the tips of the electrodes which otherwise tend to become contaminated.

In some instances, the fluid passing along the electrodes not only is polluted but is also explosive in nature. Because the ultrasonic transducer, which is mounted on the electrode, is activated by a relatively high voltage, this gives rise to a hazardous condition, for there is a danger that the high voltage applied to the transducer may find its way into the electrode signal circuit and thereby produce spark-over at the electrode, igniting the explosive fluid. Moreover, if the ultrasonic unit is inadvertently left operating when the flow tube is drained or partially full, explosive gases may be present therein, creating a dangerous condition.

SUMMARY OF THE INVENTION

In view of the foregoing, it is the main object of this invention to provide a self-cleaning electrode assembly having an ultrasonic transducer mounted thereon, the transducer being disposed within an isolation shield to prevent high voltage applied to the transducer from reaching the electrode and igniting an explosive fluid.

More specifically, it is an object of this invention to provide an electrode assembly of the above type in which an ultrasonic transducer and its high voltage connection are contained within a protective chamber defined by grounded shielding plates which electrically separate the transducer and its connection from the electrode.

Also an object of the invention is to provide an explosion-proof, self-cleaning electrode assembly suitable for use in an instrument for measuring a polluted fluid having explosive properties, which assembly operates efficiently and reliably, and may be produced at a relatively low cost.

Briefly stated, these objects are accomplished in an electrode and transducer assembly in which an annular transducer crystal is secured to the head of the electrode by means of a bolt passing through the crystal and threadably received in the head; the crystal being electrically insulated from the shank of the bolt and from the head of the electrode although being acoustically coupled thereto. A grounded shielding plate surrounding said bolt and insulated therefrom lies in contact with the undersurface of the crystal, high voltage being applied to the crystal by means of a contact plate engaging the upper surface thereof. Above the contact plate and insulated therefrom is a second shielding plate which is also grounded. The second shielding plate, which surrounds the bolt, is provided with a central metal sleeve which is insulated from and extends along the shank of the bolt to a point beyond the first shielding plate to define a grounded shielding chamber which isolates the high voltage applied to the crystal from the ultrasonically-activated electrode.

OUTLINE OF THE DRAWING

For a better understanding of the invention, as well as other objects and further features thereof, reference is made to the following detailed description to be read in conjunction with the accompanying drawing, wherein:

FIG. 1 is a schematic diagram of a magnetic flowmeter which incorporates an explosion-proof electrode assembly in accordance with the invention;

FIG. 2 is a sectional view of one preferred embodiment of the electrode assembly;

FIG. 3 separately illustrates the bolt included in the assembly;

FIG. 4 is a perspective view of the upper shielding plate included in the assembly;

FIG. 5 is a perspective view of the isolator collar included in the assembly; and FIG. 6 schematically shows another embodiment of the invention.

DESCRIPTION OF THE INVENTION

Referring now to FIG. 1, a magnetic flowmeter in accordance with the invention includes a flow tube 10, formed of any suitable non-magnetic material. An acceptable non-metallic material for this purpose is a plastic reinforced with fiberglass. If the tube is formed of a conductive material, such as non-magnetic stainless steel, it must be lined with a layer of insulating material, such as "Teflon" or "neoprene" or any other substance preventing short-circuiting of the voltage induced in the fluid passing through the tube.

A uniform magnetic field is produced across the tube by a pair of coils 11 and 12 on diametrically opposed sides thereof. To focus the magnetic field in a direction at right angles to the fluid flow, a laminated core may be used in conjunction with the coils in an arrangement of the type shown in the U.S. Pat.

to Head No. 3,055,342, dated Oct. 24, 1961. The excitation of the coils is preferably with a commercially available 60-cycle alternating voltage, although other frequencies may be used in practice. It is also possible to use non-uniform field configurations which are designed to compensate for asymmetrical velocity profiles.

Voltage generated by the flow of fluid through the magnetic field is detected by two electrodes 13 and 14 mounted at diametrically opposed positions which are normal to the direction of the magnetic field. The active faces 13a and 14a of the tips of these electrodes are preferably disposed flush with the interior wall of the flow tube 10, the electrodes being gasketed with insulating sleeves. The electrodes may be made of stainless steel, or for highly corrosive uses, platinum may be employed.

The shape of the electrodes will be considered in greater detail in connection with the other figures, the showing in FIG. 1 being schematic. Attached to the exterior ends of the electrodes 13 and 14 are ultrasonic transducers 15 and 16, respectively, which serve to generate ultrasonic energy when excited by an ultrasonic generator 17 connected thereto.

Transducers 15 and 16 are standard piezoelectric or magnetostrictive elements. Preferably they take the form of piezoelectric material such as a ceramic zirconate lead titanate element operating in the kilocycle range. A more detailed description of such crystals and other forms of ultrasonic transducers and of ultrasonic generators for operating the transducers may be found in the text, "Ultrasonics," by Benson Carlin, McGraw-Hill Book Company, 2nd edition, 1960.

The use of ultrasonic techniques to effect cleaning and degreasing of parts is well known, the cleaning action depending on cavitation and acceleration of the cleaning fluid in which the part is immersed. In the present invention, ultrasonic energy, is applied to a contaminated fluid passing through the flow tube of a magnetic flowmeter, the energy being transmitted to the fluid through the electrodes of the meter whereby the contaminated fluid being metered serves also to decontaminate the very electrode elements which it tends to contaminate.

In this way, the active surfaces of the electrodes in contact with the fluid are continuously cleaned during operation of the meter. Thus the interface resistance is held at a low value, and the conductivity of the path between the electrodes is maintained at a high level, whereby the meter accuracy is unimpaired in the course of operation. This obviates the need to disassemble the pipe line containing the meter, and there is no need to shut down the process. It will be appreciated that while the invention is shown with a continuously-operated ultrasonic electrode cleaning system, the system may be operated intermittently, if desired.

Referring now to FIG. 2, in an actual embodiment of the electrode transducer assembly, the annular transducer crystal 15 is secured to head 13H of electrode 13 by a bolt 18 passing through the bore in the crystal and threadably received in the head. Bolt 18, as shown in FIG. 3, is undercut along its shank to accommodate an insulating tube 19 which is shrunk in place thereon, thereby insulating the bolt which is part of the signal portion of the electrode from the ground sleeve 26.

The high voltage lead 30 from the ultrasonic generator 17 (FIG. 1) is connected to an annular contact plate $C_{H-V}$ engaging the top surface of crystal 15. The underface of crystal 15 is engaged by a first shielding plate 20 which is grounded and is insulated from head 13H of the electrode by insulating disc 21. Interposed between disc 21 and the top surface of head 13H is a contact plate $C_S$, serving as the signal output terminal of electrode 13. The voltage developed at the signal terminal as a function of the flow-rate of the fluid is relatively small. In order to prevent spark-over in flow tube 10, it is vital that the high voltage applied to the crystal be kept away from the signal circuit.

Sandwiched between a grounded pair of insulating discs 23 and 24 is a second shielding plate 25 which is provided with a central metal sleeve 26. Sleeve 26 extends down the shank of bolt 18 along insulating tube 19 to a point just below the plane of the first shielding plate 20. Sleeve 26 is insulated from crystal 15 and from the first shielding plate by an insulating tube 27 which is concentric with tube 19.

Surrounding crystal 15 is a collar 28 formed of Teflon or similar insulating material, the ends of the collar having complementary notches 29 to accommodate lead 30 going to the high voltage contact plate $C_{H-V}$, the lead being kept in place by a grommet 31. Above insulating disc 23 is a spacer 32 and a washer 33 which lie below the head of bolt 18.

The shielding plates 20 and 25 are provided with diametrically opposed connecting lugs which are all grounded.

It will be seen that grounded shielding plates 20 and 25 define an isolation chamber enclosing the high voltage end of crystal 15 and preventing the application of high voltage to electrode 13, thereby obviating the possibility of an explosion.

In the alternative arrangement shown in FIG. 6, the arrangement is generally similar to that in FIG. 2, except that the first shielding plate 20', which is grounded, is of relatively large diameter and is isolated from electrode head 13A by an insulating disc 22 of the same diameter, whereas the second shielding plate 25' constitutes the base of a metal shielding container 34 which surrounds the head of bolt 18. In this way, it is physically impossible for the high voltage lead to touch the electrode signal portion of the assembly.

While there have been shown and described preferred embodiments of the invention, it will be appreciated that many changes and modifications may be made therein without, however, departing from the essential spirit of the invention.

I claim:

1. A self-cleaning, explosion-proof electrode and ultrasonic transducer assembly comprising:
   A. an electrode having a head provided with a threaded bore,
   B. an annular transducer crystal adapted to generate ultrasonic energy,
   C. a bolt having a shank passing through the crystal, the end of the bolt being threadably received in the head of said electrode, said shank having an insulating tube thereon,
   D. an insulating disc interposed between said crystal and said head,
   E. a first shielding plate surrounding said bolt and engaging the undersurface of the crystal,
   F. a contact plate surrounding the bolt and engaging the upper surface of the crystal, a lead being connected to said contact plate to apply high voltage thereto to excite said crystal,
   G. a second shielding plate disposed above said contact plate and insulated from said contact plate and said bolt, said shielding plate having a central sleeve extending along said insulating tube to a point below said first shielding plate to define therewith a protective chamber isolating said high voltage from said electrode, and
   H. means to ground said first and second shielding plates.

2. An assembly as set forth in claim 1, wherein said crystal is surrounded by an insulating collar through which said lead passes.

3. An assembly as set forth in claim 1, wherein said shank of the bolt is undercut to accommodate said insulating tube.

4. An assembly as set forth in claim 1, wherein said shielding plates are each provided with diametrically opposed lugs which are grounded.

5. An assembly as set forth in claim 1, wherein said second shielding plate is the base of a container enclosing the head of the bolt.

* * * * *